Dec. 27, 1949 S. G. ISSERSTEDT 2,492,290
LAWN MOWER

Filed June 12, 1947 2 Sheets-Sheet 1

INVENTOR:
S. G. ISSERSTEDT
BY: Fetherstonhaugh & Co.
ATT'YS

Dec. 27, 1949  S. G. ISSERSTEDT  2,492,290
LAWN MOWER
Filed June 12, 1947  2 Sheets-Sheet 2
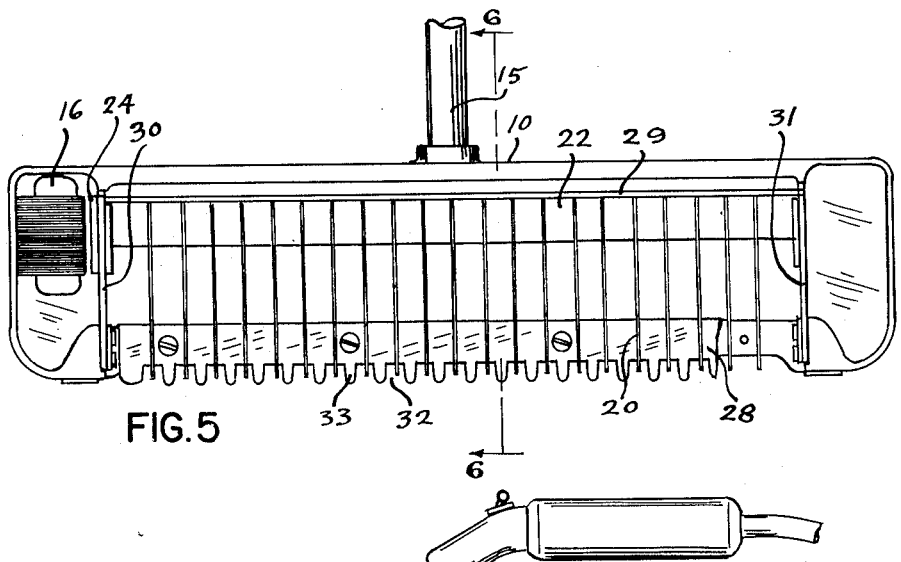
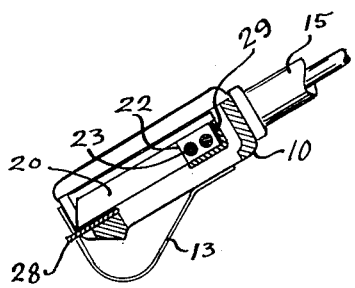
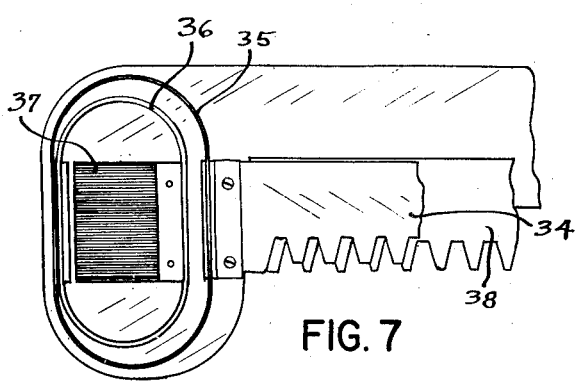
INVENTOR:
S. G. ISSERSTEDT
BY: Fetherstonhaugh & Co.
ATT'YS Patented Dec. 27, 1949

2,492,290

UNITED STATES PATENT OFFICE 2,492,290

LAWN MOWER

Siegfried Gordon Isserstedt, Toronto, Ontario, Canada

Application June 12, 1947, Serial No. 754,131

3 Claims. (Cl. 56—26.5)

This invention relates to lawn mowers, and in particular to a lawn mower having a plurality of oscillating blades cooperatively related to a series of cutter blades.

Mowers embodying a reciprocating set of cutting teeth operating in conjunction with a stationary cutter embodying a plurality of teeth and operating to cut grass between the teeth have been well known. Tests have shown that thin blades of grass are not cut properly with this type of cutter because they are generally pushed forward when the points of the oscillating blade move across the V-shaped recess of the stationary blade and this condition tends to persist even if the teeth of the blades are serrated. Alternatively, the blades of grass may be bent over the stationary blade by the reciprocating cutter blade. This condition gradually starts to become eliminated as the speed of the reciprocating blade is increased, but difficulty has been experienced in causing the blade to oscillate fast enough and with sufficient amplitude to cut all the grass as it is moved quickly over the lawn. Moreover, in these cutters in order to provide for fast reciprocating, substantially greater power is required which is a particular disadvantage. A further disadvantage results if a stone or other hard object finds its way behind the teeth of the cutters which are thereby easily broken. Among other disadvantages is the fact that grass or grass juices may enter between the two sliding blades and jam the mechanism. These disadvantages are completely overcome by the present invention and further advantages are achieved.

It is an object of the present invention to provide an improved type of grass cutter which can be constructed as a comparatively light implement and operated at an extremely fast rate to provide for efficient cutting at the expense of little power.

A further object of the invention is to provide a device of this kind which is particularly adaptable as a domestic lawn cutter and which can be used to cut very close to borders, trees, walls and the like; thus eliminating additional trimming with hand shears.

A further object of the invention is to provide a grass cutter of this general kind, the cutting blades of which will not tend to become damaged by stones and the like with which it may come in contact and wherein the elements cooperating with the cutting blades to effect the cutting operation will not tend to become damaged.

A still further object of the invention is to provide a cutter of this general kind which does not require wheels and wherein, due to the character of the moving parts, oil or special lubrication is not required.

With these and other objects in view the invention generally comprises a mower embodying a toothed cutting blade, a series of vibrating reeds cooperating with the blade, and electromagnetic means for causing oscillation of the vibrating reeds to cause the latter to bring the blades of grass into shearing contact with the cutters.

According to the invention, the electro-magnetic means set up vibrations of predetermined frequency to cause the vibrating system to operate at a natural frequency equal to the number of electro-magnetic impulses, and the spring stiffness and mass of each individual reed is chosen to have a natural frequency of vibration substantially equal to the frequency of the electrical impulses supplied to the electro-magnet and, therefore, the frequency of the armature of the electro-magnet so that the vibrating cutting means will oscillate at the same frequency but with a substantially greater amplitude than that of the armature of the electro-magnet.

The invention will be clearly understood by reference to the following detailed specification taken in conjunction with the accompanying drawings.

In the drawings:

Fig. 5 is a plan view of an alternative form of construction employing a stationary cutter.

Fig. 6 is a section taken along the line 6—6 of Fig. 5.

Fig. 7 is a plan view of a cutter head of alternative form employing reciprocating toothed blades.

Figure 1:
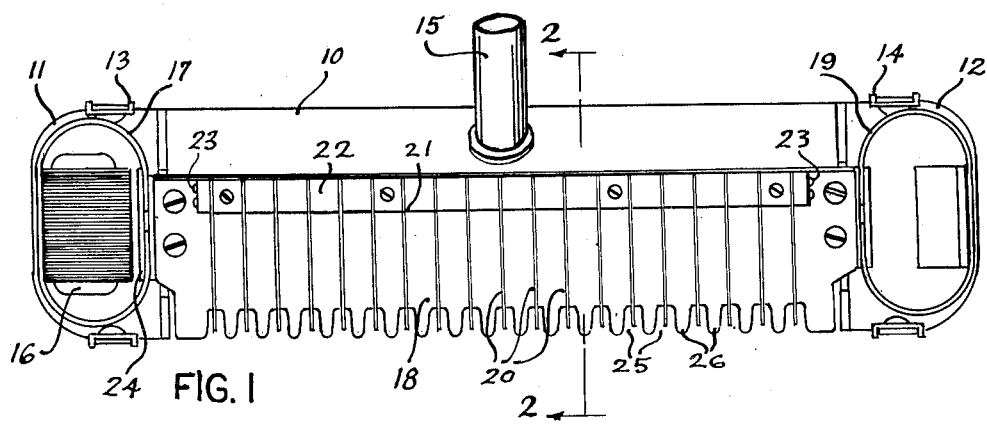
Fig. 1 is a plan view of a lawn mower according to the present invention.
Figure 2:
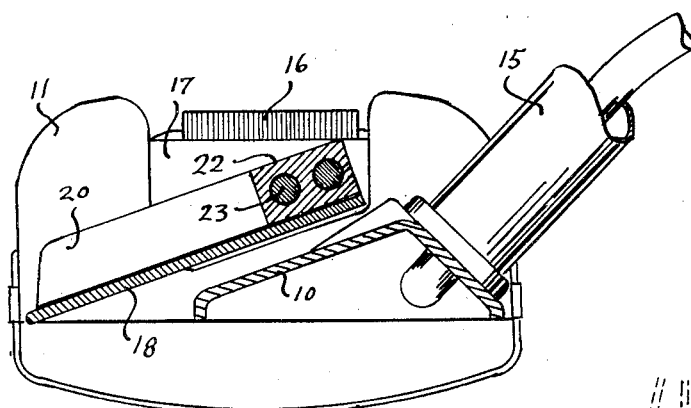
Fig. 2 is an enlarged transverse section taken along the line 2—2 of Fig. 1.
Figure 4:
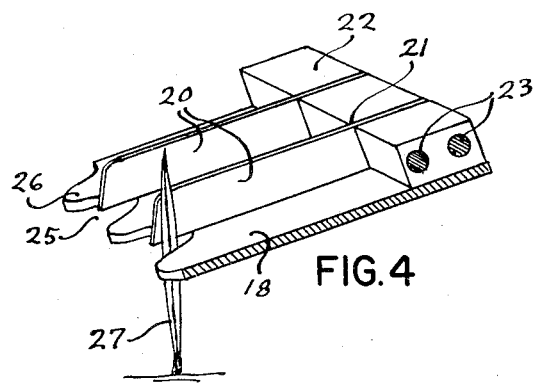
Fig. 4 is a fragmentary perspective detail showing the manner in which the grass enters between the reeds and cutters.
Figure 3:
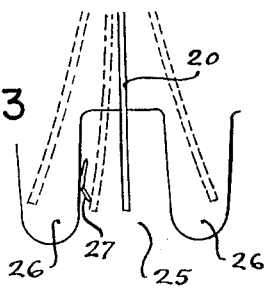
Fig. 3 is a diagrammatic fragmentary detail illustrating the vibration of the vibrating reeds of the lawn mower relatively to the cutter blades.

Referring to the drawings, a simple form of the present invention is revealed in Figures 1 to 4 and comprises a lateral support member 10 connecting a pair of end carriages 11 and 12. The assemblage is held in spaced relation with respect to a ground surface by runners 13 and 14 extending downwardly from the end carriages substantially as revealed in Figure 2. An operating handle 15 extends upwardly from the midlength of the transverse member 10 and is used to manipulate the present mower in a desired manner. An electromagnet 16 is mounted on an end carriage 11, the latter also mounting a spring 17 connected to a toothed plate 18. Plate 18 is mounted at its other end by the spring 19 to the carriage 12. The toothed blade member 18 mounts a plurality of parallelly disposed reed members 20 which are free to oscillate from side to side from their point of juncture 21 (Fig. 4) in the manner indicated in Figure 3. Suitable spacers 22 are placed between pair of reeds and in fact serve as a supporting means for the latter in conjunction with the longitudinal rods 23.

As the electromagnet 16 is energized by an alternating current it will alternately attract and repel the plate 24 of the spring 17 causing the toothed element 18 and the reed 20 to oscillate laterally at the frequency of the supplying current. To further facilitate proper oscillation all moving parts are balanced as a complete unit to have a natural period of oscillation frequency, equal to that of the exciting current. Further, the reed members 20 are similarly constructed and sweep across the gap 25 between the teeth 26 of the toothed member 18 as the blade oscillates back and forth and due to their own inertia to sheer a blade of grass 27 by impinging the same against the tooth 26 of the element.

A simplified form of the present mower is indicated by Figures 5 and 6. The structure is substantially similar and differs only in that there is a stationary toothed member 28 attached to the main frame of the mower. The moving portion of this modification is constituted by the transverse angle member 29 connected to the spring members 30 and 31 and which oscillates when energized by the electromagnet 16 to cause a sweeping action of the reeds 20 across the gaps 32 between the teeth 33 of the toothed member 28.

The last modification of the present mower to be shown is fairly obvious in view of previous disclosure. Thus, referring to Figure 7 the reeds of Figure 5 are substantially replaced by a movable blade member 34 mounted on the spring 35. The spring 35 is in turn mounted to another spring 36 attached to the main frame and the two springs cooperate together to provide proper oscillation of the movable blade 34 when the electromagnet 37 is energized by an alternating current. The stationary blade member 38 is mounted on the main frame the two blade members being designed to sheer a blade of grass engaged therebetween when the blade 34 is oscillating.

The present invention depends upon the utilization of electromagnetic driving means energized by an alternating or pulsating current. Maximum results are obtained by increasing or decreasing the length of the movable cutters to a critical value or resonance with the existing oscillations. Alternatively the mass may be increased to attain the same object. Lastly it will be appreciated that spring stiffness is a substantial factor in this connection. Further modifications may be developed without departing from the spirit of the present invention and it is intended therefore that the present disclosure shall not be limiting in any way other than that indicated by the scope of the following claims.

What I claim as my invention is:

1. In an electrically operated lawn mower having a carriage structure supporting a laterally extending toothed cutting edge, a magnetic frequency generator rigidly mounted on said carriage structure, a laterally extending member oscillatably mounted in sympathetic relation to said generator, and a plurality of reeds mounted on said laterally extending member in sympathetic relation to said generator with their free ends free to vibrate over spaces between the teeth of said above mentioned toothed edge, said reeds having an amplitude of vibration to co-act with said toothed edge to cut grass as they vibrate.

2. An electrically operated lawn mower comprising a carriage structure, a magnetic frequency generator carried by said carriage structure, a toothed blade oscillatably mounted on said carriage structure in sympathetic relation to said generator, a plurality of reeds oscillatably mounted on said blade in sympathetic relation to said generator with their free ends free to vibrate over the spaces between the teeth of said toothed blade, said reeds having an amplitude of vibration to co-act with said teeth and cut grass as they vibrate.

3. An electrically operated lawn mower comprising a carriage structure, a magnetic frequency generator carried by said carriage structure, a toothed cutting blade, spring means for oscillatably mounting said blade in said carriage structure in sympathetic oscillatory relation to said generator, a plurality of reeds oscillatably mounted on said blade in sympathetic oscillatory relation to said generator with their free ends free to vibrate over the spaces between the teeth of said blade, said reeds having an amplitude of vibration to co-act with said teeth to cut grass as they vibrate.

SIEGFRIED GORDON ISSERSTEDT.

REFERENCES CITED

The following references are of record in the file of this patent:

UNITED STATES PATENTS

| Number | Name | Date |
|---|---|---|
| 432,433 | Palmer | July 15, 1890 |
| 1,625,015 | Aron | Apr. 19, 1927 |
| 1,815,817 | Albertson | July 21, 1931 |